US011637518B2

United States Patent
Kokubo et al.

(10) Patent No.: US 11,637,518 B2
(45) Date of Patent: Apr. 25, 2023

(54) MOTOR DRIVE CONTROL DEVICE AND MOTOR DRIVE CONTROL METHOD

(71) Applicant: MINEBEA MITSUMI Inc., Nagano (JP)

(72) Inventors: Hiroki Kokubo, Fukuroi (JP); Shinji Totsuka, Fukuroi (JP); Shigemi Masuda, Fukuroi (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/477,690

(22) Filed: Sep. 17, 2021

(65) Prior Publication Data

US 2022/0123677 A1 Apr. 21, 2022

(30) Foreign Application Priority Data

Oct. 19, 2020 (JP) .............................. JP2020-175521

(51) Int. Cl.
*H02P 21/18* (2016.01)
*H02P 21/24* (2016.01)
(Continued)

(52) U.S. Cl.
CPC ................ *H02P 21/18* (2016.02); *H02P 6/18* (2013.01); *H02P 21/24* (2016.02); *H02P 21/34* (2016.02); *H02P 23/12* (2013.01); *H02P 2207/05* (2013.01)

(58) Field of Classification Search
CPC .. H02P 21/18; H02P 6/18; H02P 21/24; H02P 21/34; H02P 23/12; H02P 2207/05;
(Continued)

(56) References Cited

U.S. PATENT DOCUMENTS

| 6,396,229 B1 | 5/2002 | Sakamoto et al. |
| 10,320,317 B2* | 6/2019 | Yamasaki ............. H02P 25/089 |
| 2005/0007044 A1* | 1/2005 | Qiu ...................... G05B 13/048 |
| | | 318/717 |

FOREIGN PATENT DOCUMENTS

| JP | 2001-251889 A | 9/2001 |
| JP | 2005-051971 A | 2/2005 |

(Continued)

OTHER PUBLICATIONS

Yoon-Ho Kim, High Performance IPMSM Drives without Rotational Position Sensors Using Reduced-Order EKF, 1999, IEEE, 868-873 (Year: 1999).*

(Continued)

*Primary Examiner* — Bickey Dhakal
(74) *Attorney, Agent, or Firm* — Pearne & Gordon LLP

(57) ABSTRACT

A motor drive control device includes a drive circuit configured to drive a motor with a drive control signal for driving the motor, and a control circuit configured to perform a vector control arithmetic operation based on a detection result of drive currents of coils of the motor, to generate the drive control signal and supply the drive control signal to the drive circuit. When generating the drive control signal, the control circuit estimates a rotation angle of a rotor of the motor and a rotation speed of the rotor with a q-axis current value of a two-phase rotating coordinate system calculated with a detection result of the drive current, and a q-axis voltage command value of the two-phase rotating coordinate system, by using a linear Kalman filter including a prediction step and an update step, using a stationary Kalman filter with the prediction step expressed linearly and time-invariantly.

9 Claims, 6 Drawing Sheets

(51) Int. Cl.
      *H02P 23/12*       (2006.01)
      *H02P 6/18*        (2016.01)
      *H02P 21/34*       (2016.01)

(58) Field of Classification Search
      CPC .. H02P 2207/055; H02P 21/13; H02P 25/022; G05B 2219/33043; G05B 2219/41146
      See application file for complete search history.

(56) References Cited

FOREIGN PATENT DOCUMENTS

| | | |
|---|---|---|
| JP | 2020-006917 A | 4/2020 |
| JP | 2020-061917 A | 4/2020 |

OTHER PUBLICATIONS

Djamel Taibi, Stability analysis of the extended Kalman filter for Permanent Magnet Synchronous Motor Stability analysis of the extended Kalman filter for Permanent Magnet Synchronous Motor, 2020, HAL open science, 52-59 (Year: 2000).*

Aishwarya V, Estimation and Control of SensorlessBrushless DC Motor Drive using Extended Kalman Filter, 2016, IEEE (Year: 2016).*

* cited by examiner

MOTOR DRIVE CONTROL DEVICE AND MOTOR DRIVE CONTROL METHOD

CROSS-REFERENCE TO RELATED APPLICATIONS

This application claims the benefit of Japanese Application No. JP2020-175521 filed on Oct. 19, 2020, the entire disclosure of which is hereby incorporated herein by reference.

TECHNICAL FIELD

The present invention relates to a motor drive control device and a motor drive control method.

BACKGROUND ART

In general, permanent magnet synchronous motors (PMSMs) serving as brushless DC motors are roughly classified into a surface permanent magnet synchronous motor (SPMSM) having a permanent magnet attached to the surface of a rotating element, and an interior permanent magnet synchronous motor (IPMSM) having a permanent magnet embedded in a rotating element.

Furthermore, a known method of controlling a permanent magnet synchronous motor (PMSM) is a sensorless vector control method including estimating the rotation angle and rotation speed of a rotating element (rotor) of a motor to control drive of the motor without using a sensor such as a Hall element.

Typical known sensorless vector control methods include a technique for detecting the current flowing through a coil of a motor and estimating the rotation position of a rotor on the basis of the induced voltage of the coil (see, for example, JP 2001-251889 A), and a technique for estimating the rotation position of a rotor from the relationship between the voltage and current of a high frequency, by utilizing the position dependency of inductance originating from the saliency of the motor (see, for example, JP 2020-61917 A).

However, in the method for estimating the rotation position of the rotor by utilizing the induced voltage generated in the coil of the motor, the induced voltage depends on the rotation speed of the rotor, and thus, it is not possible to estimate the rotation position of the rotor when the rotor is stopped. Additionally, when the rotor rotates at a relatively low speed, the rotation position of the rotor cannot be estimated accurately.

Furthermore, in the method for estimating the rotation position of the rotor on the basis of the saliency of the motor, in the case of a motor having no saliencies and identical d-axis inductance Ld and q-axis inductance Lq (Ld=Lq) as in the surface permanent magnet synchronous motor (SPMSM), it is not possible to estimate the rotation position of the rotor.

A known method for solving the above-mentioned problems in sensorless vector control methods includes a sensorless vector control method using an extended Kalman filter (see, for example, JP 2005-51971 A). With the sensorless vector control method using the extended Kalman filter, it is possible to estimate the rotation position of the rotor even when the rotor is stopped, regardless of whether the motor has saliency.

CITATION LIST

Patent Literature

Patent Document 1: JP 2001-251889 A
Patent Document 2: JP 2020-61917 A
Patent Document 3: JP 2005-51971 A

SUMMARY OF INVENTION

Technical Problem

However, in a sensorless vector control method using a conventional extended Kalman filter, a prediction step in the extended Kalman filter cannot be expressed linearly or time-invariantly, and thus, the Kalman gain must be sequentially calculated. Therefore, a complex arithmetic operation is required, and thus, the arithmetic load increases. Accordingly, a motor drive control device employing a sensorless vector control method using a conventional extended Kalman filter requires a program processing device (for example, a microcontroller) having high processing capacity to execute complex arithmetic operations at high speed, which leads to higher costs.

The present invention is contrived for solving the above-mentioned problems, and an object of the present invention is to reduce the arithmetic load in sensorless vector control.

Solution to Problem

A motor drive control device according to a typical embodiment of the present invention includes a drive circuit configured to drive a motor on the basis of a drive control signal for driving the motor, and a control circuit configured to perform a vector control arithmetic operation based on a detection result of a drive current of a coil of the motor to generate the drive control signal and supply the drive control signal to the drive circuit. When generating the drive control signal, the control circuit estimates a rotation angle of a rotor of the motor and a rotation speed of the rotor, on the basis of a q-axis current value of a two-phase rotating coordinate system calculated on the basis of a detection result of the drive current, and a q-axis voltage command value of the two-phase rotating coordinate system, by using a linear Kalman filter including a prediction step and an update step, the linear Kalman filter being a stationary Kalman filter with the prediction step expressed linearly and time-invariantly.

Advantageous Effects of Invention

According to an aspect of the present invention, it is possible to reduce the arithmetic load in sensorless vector control.

DESCRIPTION OF EMBODIMENTS

1. Overview of Embodiment

Figure 1:
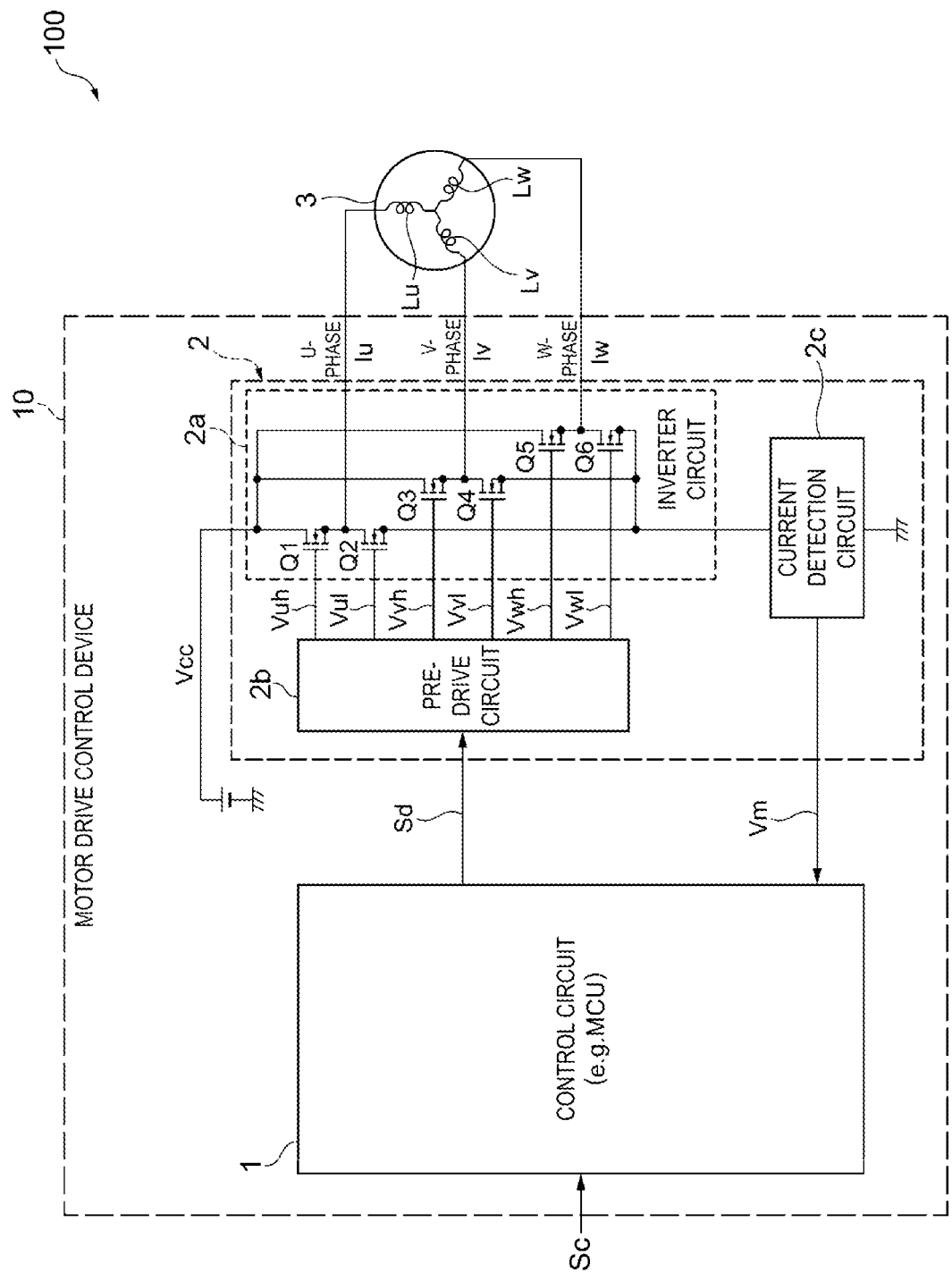
FIG. 1 is a diagram illustrating a configuration of a motor unit including a motor drive control device according to the present embodiment.

First, an overview of a typical embodiment of the invention disclosed in the present application will be described. Note that, in the following description, reference numerals in the drawings corresponding to the constituent elements of the invention are mentioned in parentheses to denote examples.

(1) A motor drive control device (10) according to a typical embodiment of the present invention includes a drive circuit (2) configured to drive a motor (3) on the basis of a drive control signal (Sd) for driving the motor, and a control circuit (1) configured to perform a vector control arithmetic operation based on a detection result of drive currents (Iu, Iv, and Iw) of coils (Lu, Lv, and Lw) of the motor to generate the drive control signal and supply the drive control signal to the drive circuit. The control circuit estimates, when generating the drive control signal, a rotation angle (θ) of a rotor of the motor and a rotation speed (ω) of the rotor, on the basis of a q-axis current value (Iq) of a two-phase rotating coordinate system calculated on the basis of a detection result of the drive currents, and a q-axis voltage command value (Vqref) of the two-phase rotating coordinate system, by using a linear Kalman filter including a prediction step and an update step, the linear Kalman filter being a stationary Kalman filter with the prediction step expressed linearly and time-invariantly.

(2) In the motor drive control device according to (1) above, the control circuit includes a drive current value acquisition unit (13) configured to acquire drive current values (Iu, Iv, and Iw) of the coils of the motor, an estimation unit (14) configured to estimate the rotation angle (θ) and the rotation speed (ω), a first coordinate transform unit (15) configured to perform Clarke transformation and Park transformation on the basis of the drive current value acquired by the drive current value acquisition unit and the rotation angle estimated by the estimation unit to calculate the q-axis current value (Iq) and a d-axis current value (Id) of the two-phase rotating coordinate system, a q-axis current command value calculation unit (17) configured to calculate a q-axis current command value (Icref) of the two-phase rotating coordinate system on the basis of values (ωref and Tref) indicating a target state of an operation of the motor, and a q-axis voltage command value calculation unit (19) configured to calculate the q-axis voltage command value (Vqref) of the two-phase rotating coordinate system, so that a difference between the q-axis current command value (Iqref) calculated by the q-axis current command value calculation unit and a value based on the q-axis current value calculated by the first coordinate transform unit is small, and the estimation unit may perform an arithmetic operation based on the linear Kalman filter, and in the arithmetic operation based on the linear Kalman filter, the estimation unit may receive the q-axis current value calculated by the first coordinate transform unit and the q-axis voltage command value calculated by the q-axis voltage command value calculation unit and output an estimation value of the rotation angle and an estimation value of the rotation speed.

(3) In the motor drive control device according to (1) or (2) above, the motor may be expressed by a state space model derived from an equation of a q-axis voltage (Vq) of the motor when a d-axis current value is zero (Id=0) and the rotation speed is constant (dω/dt=0), and at least the q-axis current value (Iq), the rotation angle (θ), and the rotation speed (we) may be state variables.

(4) In the motor drive control device according to (3) above, a state vector x (t) including the state variables may be expressed by Equation (6) described later and the state space model may be expressed by Equations (8) and (9) described later, in Equations (6), (8), and (9), Iq(t) is the q-axis current value, ωe(t) is an electric angular velocity as the rotation speed, θ(t) is the rotation angle, and Vqref is the q-axis voltage command value, and Ac, Bc, and c in Equations (8) and (9) described later may each be expressed by Equations (10) described later, and in Equations (10), Ra is a resistance of the coil, Lq is a q-axis inductance, and Ψa is a magnetic flux of a magnet in a d-axis direction.

(5) In the motor drive control device according to (4) above, the control circuit may calculate a prior state estimation value ($\hat{x}_{k/k-1}$) of the state variables on the basis of Equation (18) described later in the prediction step, and may calculate a posterior state estimation value ($\hat{x}_{k/k}$) of the state variables on the basis of Equation (19) described later in the update step, and Ad, Bd, and g in Equations (18) and (19) described later may be fixed values.

(6) In the motor drive control device according to (5) above, the control circuit may include a storage unit (24) configured to store arithmetic expression information (241) including the Equations (18) and (19) and coefficient information (242) including at least values of Ad, Bd, and g, and the control circuit may calculate an estimation value of the rotation angle and an estimation value of the rotation speed by using the arithmetic expression information and the coefficient information stored in the storage unit.

(7) In the motor drive control device according to any one of (1) to (6) above, the control circuit (1) may estimate the rotation angle and the rotation speed after identifying an initial position of the rotor.

(8) In the motor drive control device according to any one of (1) to (7) above, a value indicating the target state of the operation of the motor may be a target value (ωref) of the rotation speed of the motor.

(9) In the motor drive control device according to any one of (1) to (7) above, the value indicating the target state of the operation of the motor may be a target value (Tref) of torque of the motor.

(10) A motor drive control method according to a typical embodiment of the present invention includes a first step (S5) of acquiring drive current values (Iu, Iv, and Iw) of coils (Lu, Lv, and Lw) of a motor (3), and a second step (S6 to S12) of performing a vector control arithmetic operation based on the drive current values acquired in the first step to generate a drive control signal (Sd) for driving the motor, the second step includes estimating (S10) a rotation angle of a rotor of the motor and a rotation speed of the rotor on the basis of a q-axis current value of a two-phase rotating coordinate system calculated on the basis of the drive current value, and a q-axis voltage command value of the two-phase rotating coordinate system, by using a linear Kalman filter, the linear Kalman filter being a stationary Kalman filter with the prediction step expressed linearly and time-invariantly.

2. Specific Examples of Embodiment

Below, specific examples of the embodiment of the present invention will be described with reference to the drawings. Note that, in the following description, constituent elements common to each of the embodiments are denoted with the same reference symbols and will not be described repeatedly.

FIG. 1 is a diagram illustrating a configuration of a motor unit 100 including a motor drive control device 10 according to the present embodiment.

As illustrated in FIG. 1, the motor unit 100 includes a motor 3 and the motor drive control device 10 configured to control rotation of the motor 3. The motor unit 100 can be employed in various devices that use a motor as a drive source, such as a fan.

The motor 3 is, for example, a permanent magnet synchronous motor (PMSM). In the present embodiment, the motor 3 is, for example, a surface permanent magnet synchronous motor (SPMSM) including coils Lu, Lv, and Lw in three phases. The coils Lu, Lv, and Lw are Y-connected to each other, for example.

For example, the motor drive control device 10 applies a sine wave drive signal to the motor 3 to cause a drive current having a sine wave form to periodically flow to the coils Lu, Lv, and Lw in the three phases of the motor 3 to rotate a rotor of the motor 3. The motor drive control device 10 estimates a rotation angle and a rotation speed of the motor 3 by a position sensorless method without using a rotation position detection device such as a Hall element for detecting the rotation position of the motor 3 to perform sensorless vector control for controlling the drive of the motor 3.

The motor drive control device 10 includes a control circuit 1 and a drive circuit 2.

Note that not all of the constituent elements of the motor drive control device 10 are illustrated in FIG. 1, and that the motor drive control device 10 may include other constituent elements in addition to those illustrated in FIG. 1.

The drive circuit 2 drives the motor 3 on the basis of a drive control signal Sd output from the control circuit 1 described later. The drive circuit 2 includes an inverter circuit 2a, a pre-drive circuit 2b, and a current detection circuit 2c.

The inverter circuit 2a is a circuit arranged between a DC power supply Vcc and a ground potential and is configured to drive the coils Lu, Lv, and Lw of the motor 3 serving as a load on the basis of an input drive control signal Sd. Specifically, in the present embodiment, the inverter circuit 2a includes three switching legs including two drive transistors connected in series, and the two drive transistors alternately perform an on/off operation (switching operation) on the basis of the input drive control signal Sd to drive the motor 3 serving as a load.

More specifically, the inverter circuit 2a includes switching legs corresponding to each of the U-phase, the V-phase, and the W-phase of the motor 3. As illustrated in FIG. 1, the switching legs corresponding to each of the phases include two drive transistors Q1 and Q2, Q3 and Q4, and Q5 and Q6 connected in series between the DC power supply Vcc and the ground potential via the current detection circuit 2c.

Here, the drive transistors Q1, Q3, and Q5 are P-channel MOSFETs, for example, and the drive transistors Q2, Q4, and Q6 are N-channel MOSFETs, for example. Note that the drive transistors Q1 to Q6 may be other types of power transistors such as an insulated gate bipolar transistor (IGBT).

For example, the switching leg corresponding to the U-phase includes the drive transistors Q1 and Q2 connected in series with each other. The point connected commonly with the drive transistor Q1 and the drive transistor Q2 is connected to one end of the coil Lu serving as a load. The switching leg corresponding to the V-phase includes the drive transistors Q3 and Q4 connected in series with each other. The point connected commonly with the drive transistor Q3 and the drive transistor Q4 is connected to one end of the coil Lv serving as a load. The switching leg corresponding to the W-phase includes the drive transistors Q5 and Q6 connected in series with each other. The point commonly connected with the drive transistor Q5 and the drive transistor Q6 is connected to one end of the coil Lw serving as a load.

Based on the drive control signal Sd output from the control circuit 1, the pre-drive circuit 2b generates a drive signal for driving the inverter circuit 2a.

The drive control signal Sd is a signal used for controlling the drive of the motor 3 and is a pulse width modulation (PWM) signal, for example. Specifically, the drive control signal Sd is a signal used for switching a current flowing pattern of the coils Lu, Lv, and Lw of the motor 3 determined by an on/off state of individual switch elements constituting the inverter circuit 2a. More specifically, the drive control signal Sd includes six types of PWM signals individually corresponding to the drive transistors Q1 to Q6 of the inverter circuit 2a.

Based on the six types of PWM signals serving as the drive control signal Sd supplied from the control circuit 1, the pre-drive circuit 2b generates six types of drive signals Vuu, Vul, Vvu, Vvl, Vwu, and Vwl capable of supplying sufficient power for driving control electrodes (gate electrodes) of each of the drive transistors Q1 to Q6 of the inverter circuit 2a.

When these drive signals Vuu, Vul, Vvu, Vvl, Vwu, and Vwl are input to the control electrodes (gate electrodes) of each of the drive transistors Q1 to Q6 of the inverter circuit 2a, each of the drive transistors Q1 to Q6 performs an on/off operation (switching operation). For example, the drive transistors Q1, Q3, and Q5 on an upper arm and the drive transistors Q2, Q4, and Q6 on a lower arm of the switching legs corresponding to each of the phases alternately perform an on/off operation. Thus, the DC power supply Vcc supplies power to each of the phases of the motor 3 to rotate the motor 3.

The current detection circuit 2c is a circuit for detecting drive currents of the coils Lu, Lv, and Lw of the motor 3. The current detection circuit 2c includes a resistor (shunt resistor) as a current detection element, for example. The resistor is connected in series with the inverter circuit 2a between the DC power supply Vcc and the ground potential, for example. In the present embodiment, the resistor as the current detection circuit 2c is connected to a negative side (ground side) of the inverter circuit 2a, for example. The current detection circuit 2c converts a current flowing through the coils Lu, Lv, and Lw of the motor 3 into a voltage by the resistor mentioned above, and inputs the voltage as a current detection signal Vm to the control circuit 1.

When a drive command signal Sc instructing a target state of an operation of the motor 3 is input from the outside (for example, from a higher-level device), the control circuit 1 uses sensorless vector control to generate the drive control signal Sd so that the motor 3 enters an operation state specified by the drive command signal Sc, to drive the motor 3 via the drive circuit 2.

In the present embodiment, the control circuit 1 is a program processing device (for example, a microcontroller) having a configuration where a processor such as a CPU, various types of storage devices such as a RAM and a ROM, and a peripheral circuit such as a counter (timer), an A/D conversion circuit, a D/A conversion circuit, a clock generation circuit, and an input/output OF circuit are connected with each other via a bus or a dedicated line, for example.

Note that the motor drive control device 10 may be configured to include a single integrated circuit device (IC) package containing at least a part of the control circuit 1 and at least a part of the drive circuit 2, or configured to include separate integrated circuit device packages each containing one of the control circuit 1 and the drive circuit 2.

In sensorless vector control, the control circuit 1 estimates a rotation angle and a rotation speed of the motor 3 by an arithmetic operation using a Kalman filter, and generates the drive control signal Sd on the basis of these estimation values. Below, sensorless vector control using a Kalman filter performed by the control circuit 1 will be described in detail.

Figure 2:
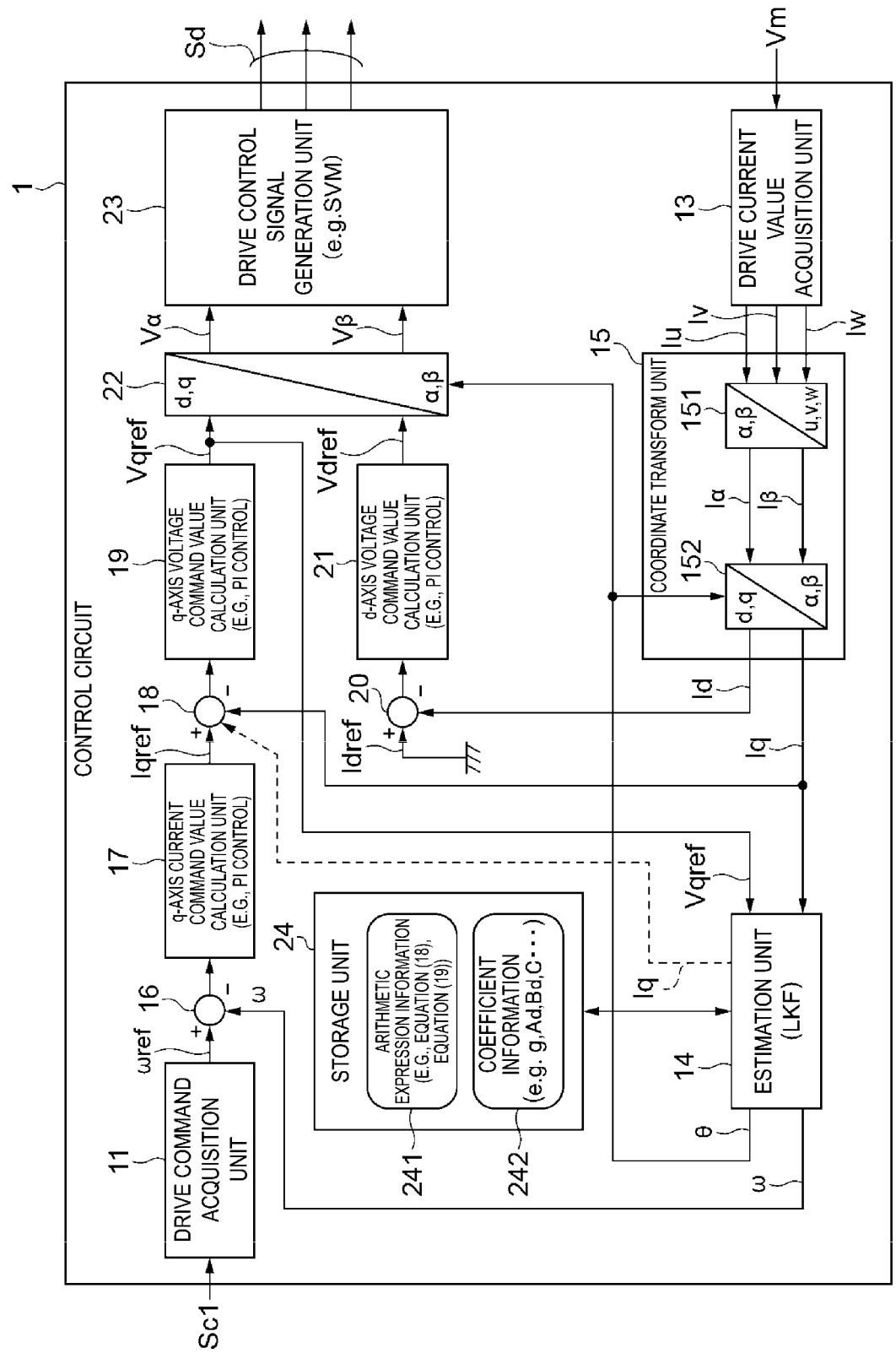
FIG. 2 is a diagram illustrating a functional block configuration of a control circuit in the motor drive control device according to the present embodiment.

FIG. 2 is a diagram illustrating a functional block configuration of the control circuit 1 in the motor drive control device 10 according to the present embodiment.

As illustrated in FIG. 2, the control circuit 1 includes, as functional blocks for achieving sensorless vector control using a Kalman filter, a drive command acquisition unit 11, a drive current value acquisition unit 13, a coordinate transform unit (an example of a first coordinate transform unit) 15, an estimation unit 14, error calculation units 16, 18, and 20, a q-axis current command value calculation unit 17, a q-axis voltage command value calculation unit 19, a d-axis voltage command value calculation unit 21, a coordinate transform unit (an example of a second coordinate transform unit) 22, a drive control signal generation unit 23, and a storage unit 24.

In a program processing device functioning as the control circuit 1, these functional blocks are achieved, for example, by a processor executing various types of arithmetic processes in accordance with a program stored in a memory, and controlling a peripheral circuit such as a counter or an A/D conversion circuit.

The drive command acquisition unit 11 receives the drive command signal Sc from the outside, and analyzes the received drive command signal Sc to acquire a value defining a target operation state of the motor 3 specified by the drive command signal Sc.

The drive command signal Sc includes a value indicating a target state of an operation of the motor 3. The drive command signal Sc is, for example, a signal output from a host device configured to control the motor unit 100. The host device is provided outside the motor drive control device 10.

In the present embodiment, the drive command signal Sc is, for example, a speed command signal Sc1 specifying the rotation speed of the rotor of the motor 3. The drive command signal Sc includes a value $\omega$ref of a targeted rotation speed (target rotation speed) of the rotor of the motor 3. Hereinafter, in the present embodiment, description is given under the assumption that the drive command signal Sc is the speed command signal Sc1.

The speed command signal Sc1 is, for example, a PWM signal having a duty ratio according to a specified target rotation speed $\omega$ref. For example, the drive command acquisition unit 11 measures the duty ratio of the PWM signal as the speed command signal Sc1, and outputs, as the target rotation speed cord, a rotation speed according to the measured duty ratio.

The drive current value acquisition unit 13 is a functional unit configured to acquire measurement values of drive current values Iu, Iv, and Iw of the coils Lu, Lv, and Lw of the motor 3, respectively. The drive current value acquisition unit 13 calculates, for example, a measurement value of the current flowing through the U-phase coil Lu (the drive current value Iu), a measurement value of the current flowing through the V-phase coil Lv (the drive current value Iv), and a measurement value of the current flowing through the W-phase coil Lw (the drive current value Iw) on the basis of the current detection signal Vm output from the current detection circuit 2c.

The coordinate transform unit (an example of the first coordinate transform unit) 15 is a functional unit configured to calculate a d-axis current value Id and a q-axis current value Iq of a two-phase (d, q) rotating coordinate system on the basis of the drive current values (phase currents) Iu, Iv, and Iw, of each phase, acquired by the drive current value acquisition unit 13 and a rotation angle $\theta$ of the rotor estimated by the estimation unit 14 described later.

Specifically, the coordinate transform unit 15 includes a Clarke transform unit 151 and a Park transform unit 152. The Clarke transform unit 151 applies Clarke transformation to the drive current values Iu, Iv, and Iw, of a three-phase (U, V, W) fixed coordinate system, acquired by the drive current value acquisition unit 13 to calculate currents I$\alpha$ and I$\beta$ of a two-phase ($\alpha$, $\beta$) fixed coordinate system (Cartesian coordinate system). The Park transform unit 152 applies Park transformation to the currents I$\alpha$ and I$\beta$ of the two-phase fixed coordinate system by using the rotation angle $\theta$ (sin $\theta$, and cos $\theta$) estimated by the estimation unit 14 to calculate the d-axis current value Id and the q-axis current value Iq of the two-phase (d, q) rotating coordinate system (d, q).

The estimation unit 14 is a functional unit configured to estimate the rotation angle (rotation position) $\theta$ of the rotor of the motor 3 and a rotation speed co of the rotor. The storage unit 24 is a functional unit configured to store various types of data necessary for arithmetic operation by the estimation unit 14. The estimation unit 14 and the storage unit 24 will be described in detail later.

The error calculation unit 16 is a functional unit configured to calculate a difference ($\omega$ref–$\omega$) between the target rotation speed $\omega$ref output from the drive command acquisition unit 11 and the actual rotation speed $\omega$ of the motor 3 estimated by the estimation unit 14.

The q-axis current command value calculation unit 17 is a functional unit configured to calculate a q-axis current command value Iqref so that the difference between the target rotation speed $\omega$ref and the rotation speed $\omega$ of the motor 3 calculated by the error calculation unit 16 is small. For example, the q-axis current command value calculation unit 17 calculates, by a PI control arithmetic operation, the q-axis current command value Iqref so that the error ($\omega$ref–$\omega$) calculated by the error calculation unit 16 is zero.

The error calculation unit 18 is a functional unit configured to calculate the difference (Iqref–Iq) between the q-axis current command value Iqref calculated by the q-axis current command value calculation unit 17 and a value based on the q-axis current value Iq calculated by the coordinate transform unit 15.

Here, the value based on the q-axis current value Iq calculated by the coordinate transform unit 15 may be the q-axis current value Iq output from the coordinate transform unit 15, or may be an estimation value of the q-axis current value Iq calculated by the estimation unit 14. For example, the error calculation unit 18 may acquire the q-axis current value Iq from the coordinate transform unit 15, or may acquire the estimation value of the q-axis current value Iq calculated by the estimation unit 14.

The q-axis voltage command value calculation unit 19 is a functional unit configured to calculate a q-axis voltage command value Vqref so that the difference, calculated by the error calculation unit 18, between the q-axis current command value Iqref and the value based on the q-axis current value Iq calculated by the coordinate transform unit 15, is small. For example, the q-axis voltage command value calculation unit 19 calculates, by a PI control arithmetic operation, the q-axis voltage command value Vqref so that the error (Iqref−Iq) calculated by the error calculation unit 18 is zero.

The error calculation unit 20 is a functional unit configured to calculate a difference (Idref−Id) between a d-axis current command value Idref and the d-axis current value Id calculated by the coordinate transform unit 15. In the present embodiment, it is assumed that the motor 3 is a surface permanent magnet synchronous motor (SPMSM), and thus, Idref=0 is assumed.

The d-axis voltage command value calculation unit 21 is a functional unit configured to calculate a d-axis voltage command value Vdref so that the difference between the d-axis current command value Idref and the d-axis current value Id, calculated by the error calculation unit 20, is small. For example, the d-axis voltage command value calculation unit 21 calculates, by a PI control arithmetic operation, the d-axis voltage command value Vdref so that the error (Idref−Id) calculated by the error calculation unit 20 is zero.

The coordinate transform unit (an example of the second coordinate transform unit) 22 is a functional unit configured to transform the q-axis voltage command value Vqref calculated by the q-axis voltage command value calculation unit 19 and the d-axis voltage command value Vdref calculated by the d-axis voltage command value calculation unit 21 into the voltage command values Vα and Vβ, respectively, of a two-phase (α, β) fixed coordinate system. Specifically, the coordinate transform unit 22 applies inverse Park transformation to the d-axis voltage command value Vdref and the q-axis voltage command value Vqref to calculate the voltage command values Vα and Vβ.

The drive control signal generation unit 23 is a functional unit configured to generate the drive control signal Sd on the basis of the voltage command values Vα and Vβ of the two-phase (α, β) fixed coordinate system calculated by the coordinate transform unit 22. The drive control signal generation unit 23 transforms the voltage command values Vα and Vβ into a voltage signal (PWM signal) of a three-phase (U, V, W) fixed coordinate system by a known space vector conversion arithmetic method, for example, and outputs the transformed signal as the drive control signal Sd to the drive circuit 2. Note that the arithmetic method used by the drive control signal generation unit 23 is not limited to space vector conversion, and the drive control signal generation unit 23 may generate the drive control signal Sd by another method such as a triangular wave comparison method.

Here, a method for estimating the rotation angle θ and the rotation speed w of the rotor of the motor 3 by the control circuit 1 will be described.

When generating the drive control signal Sd, the control circuit 1 estimates the rotation angle θ and the rotation speed ω (electric angular velocity ωe) of the motor 3 by using a linear Kalman filter having, as input values, the q-axis current value Iq of the two-phase (d, q) rotating coordinate system, calculated on the basis of a detection result of the drive current of the motor 3, and the q-axis voltage command value Vqref of the two-phase rotating coordinate system.

Specifically, the estimation unit 14 performs an arithmetic operation based on a linear Kalman filter. In the arithmetic operation based on a linear Kalman filter, the estimation unit 14 receives the q-axis current value Iq calculated by the coordinate transform unit 15 and the q-axis voltage command value Vqref calculated by the q-axis voltage command value calculation unit 19 and outputs an estimation value of the rotation angle θ of the rotor and an estimation value of the rotation speed w of the rotor.

The linear Kalman filter in the present embodiment includes a prediction step and an update step. The prediction step is a stationary Kalman filter expressed linearly and time-invariantly.

A linear Kalman filter according to the present embodiment will be described below.

First, a general Kalman filter will be described. A Kalman filter is a calculation method for efficiently estimating an invisible internal "state" in a state space model. The normality for state variables to be estimated is assumed, and an average value (estimation value) and a variance (covariance matrix) of the state variables are sequentially estimated. The Kalman filter includes a prediction step of predicting a current state from an estimation value of a preceding state, and an update step (filtering step) of correcting the state predicted in the prediction step by using a current observation value.

Here, the prediction step is expressed by Equation (1) below, and the update step is expressed by Equation (2) below.

[Math. 1]

$$\hat{x}^- = f[\hat{x}(k-1), u(k-1)] \quad (1)$$

[Math. 2]

$$\hat{x}(k) = G\hat{x}^-(k) + g(k)y(k) \quad (2)$$

In Equations (1) and (2), u represents an input and G and g represent gains.

Here, when the prediction step can be expressed linearly, that is, when the prediction step is expressed by Equation (3) below, the Kalman filter is a linear Kalman filter.

[Math. 3]

$$\hat{x}^-(k) = f[\hat{x}(k-1), u(k-1)] = A\hat{x}(k-1) + Bu(k-1) \quad (3)$$

Furthermore, when the coefficients A and B in Equation (3) above for the prediction step are time-invariant, the linear Kalman filter is a stationary Kalman filter. In this case, the covariance matrix has a constant value, and the Kalman gain has also a constant value. That is, when the Kalman filter is linear and time-invariant, the values of the covariance matrix and the Kalman gain do not change but remain constant in each prediction step and in each arithmetic operation step of the prediction step.

In an extended Kalman filter used for sensorless vector control in a conventional motor, the prediction step is not expressed linearly and time-invariantly, and thus, it is necessary to calculate the covariance matrix and Kalman gain each time the prediction step and the arithmetic operation of the prediction step are performed.

On the other hand, in the sensorless vector control by the motor drive control device 10 according to the present embodiment, a stationary Kalman filter (linear Kalman filter) expressed linearly and time-invariantly is used in the prediction step, so that the values of the covariance matrix and the Kalman gain are fixed values. Therefore, these values can be calculated in advance, and it is not necessary to calculate these values every time the prediction step and the arithmetic operation of the prediction step are performed.

Next, a linear Kalman filter used in the sensorless vector control according to the present embodiment will be described.

Generally, the voltage equation of a permanent magnet synchronous motor (PMSM) in a two-phase (d, q) rotating coordinate system is expressed by Equation (4) below.

[Math. 4]
$$\begin{bmatrix} V_d \\ V_q \end{bmatrix} = \begin{bmatrix} R_a + sL_d & 0 \\ 0 & R_a + sL_q \end{bmatrix} \begin{bmatrix} I_d \\ I_q \end{bmatrix} + \begin{bmatrix} 0 & -\omega_e L_q \\ \omega_e L_d & 0 \end{bmatrix} \begin{bmatrix} I_d \\ I_q \end{bmatrix} + \begin{bmatrix} 0 \\ \omega_e \Psi_a \end{bmatrix} \quad (4)$$

In Equation (4) above, Vd is the d-axis voltage, Vq is the q-axis voltage, Ra is a winding resistance of the coil of the motor, Ld is d-axis inductance, Lq is q-axis inductance, ωe is the electric angular velocity, Ψa is a magnetic flux in a d-axis direction of the magnet of the rotor, and s is a differential operator.

From Equation (4) above, an equation of the q-axis voltage Vq can be expressed by Equation (5) below.

[Math. 5]
$$V_q = R_a I_q + L_q \frac{d}{dt} I_q + \omega_e L_d I_d + \omega_e \Psi_a \quad (5)$$

Here, assuming that the q-axis current value Iq, the rotation angle θ, and the electric angular velocity ωe are state variables, a state vector is defined by Equation (6) below.

[Math. 6]
$$x(t) = \begin{pmatrix} I_q(t) \\ \omega_e(t) \\ \theta(t) \end{pmatrix} \quad (6)$$

Furthermore, as illustrated in Equation (7), the d-axis current value Id is defined as zero and the rotation speed (electric angular velocity we) is defined as being constant.

[Math. 7]
$$\frac{d\omega_e}{dt} = 0, \quad I_d = 0 \quad (7)$$

At this time, from Equations (5), (6), and (7) above, the state space model of the motor 3 according to the present embodiment is expressed by Equations (8) and (9) below.

[Math. 8]
$$\frac{dx(t)}{dt} = A_c x(t) + B_c V_q(t) \quad (8)$$

[Math. 9]
$$I_q(t) = c^T x(t) \quad (9)$$

Here, Ac, Bc, and c are each defined by Equation (10) below.

[Math. 10]
$$A_c = \begin{pmatrix} -\dfrac{R_a}{L_q} & -\dfrac{\Psi_a}{L_q} & 0 \\ 0 & 0 & 0 \\ 0 & 1 & 0 \end{pmatrix}, \quad (10)$$

$$B_c = \begin{pmatrix} \dfrac{1}{L_q} \\ 0 \\ 0 \end{pmatrix},$$

$$c = \begin{pmatrix} 1 \\ 0 \\ 0 \end{pmatrix}$$

Thus, if the d-axis current value Id is defined as zero and the rotation speed (the electric angular velocity ωe) is defined as being constant, the state space model of the motor 3 can be expressed linearly and time-invariantly, as indicated by Equations (8) to (10) above.

Next, a method of estimating the rotation angle θ and the rotation speed ω (electric angular velocity ωe) of the motor 3 by using the above-mentioned linear Kalman filter will be described.

The estimation unit 14 in the control circuit 1 sequentially executes the arithmetic operation of the prediction step and the arithmetic operation of the update step (filtering step) for each predetermined sampling period Ts. Generally, in the prediction step of the Kalman filter, each of a prior state estimation value $\hat{x}_{k|k-1}$ and a prior error covariance matrix $P_{k|k-1}$ are calculated. Here, the prior state estimation value $\hat{x}_{k|k-1}$ is expressed by Equation (11) below and the prior error covariance matrix $P_{k|k-1}$ is expressed by Equation (12) below.

[Math. 11]
$$\hat{x}_{k|k-1} = A_d \hat{x}_{k-1|k-1} + B_d V_q \quad (11)$$

[Math. 12]
$$P_{k|k-1} = A_d P_{k-1|k-1} A_d^T + Q \quad (12)$$

Furthermore, in the update step (filtering step) of the Kalman filter, each of the Kalman gain g(k), a posterior state estimation value $\hat{x}_{k|k}$ and a posterior error covariance matrix $P_{k|k}$ are calculated. Here, the Kalman gain g(k) is expressed by Equation (13) below, the posterior state estimation value $\hat{x}_{k|k}$ is expressed by Equation (14) below, and the posterior error covariance matrix $P_{k|k}$ is expressed by Equation (15) below.

[Math. 13]
$$g(k) = P_{k|k-1} c (c^T P_{k|k-1} c + R)^{-1} \quad (13)$$

[Math. 14]
$$\hat{x}_{k|k} = \hat{x}_{k|k-1} + g(k)(I_q - c^T \hat{x}_{k|k-1}) \quad (14)$$

[Math. 15]

$$P_{k/k} = P_{k/k-1} - g(k)c^T P_{k/k-1} \quad (15)$$

Here, Q is a tuning parameter of a 3×3 matrix, and R is a tuning parameter of a scalar. Furthermore, Ad and Bd can be expressed by Equations (16) and (17) below, respectively, using Ac, Bc, and a control period (sampling period) Ts.

[Math. 16]

$$A_d = e^{A_c T_s} = I + \frac{1}{1!} A_c T_s + \frac{1}{2!} A_c^2 T_s^2 + \frac{1}{3!} A_c^3 T_s^3 + \cdots \quad (16)$$

[Math. 17]

$$B_d = \left\{ \int_0^{T_s} e^{A_c(T_s-t)} dt \right\} B_c = \left( \frac{1}{1!} I T_s + \frac{1}{2!} A_c T_s^2 + \frac{1}{3!} A_c^2 T_s^3 + \cdots \right) B_c \quad (17)$$

If Ad and Bd are expressed by approximation equations including terms up to a desired order in Equations (16) and (17) above, Ad and Bd can be calculated in advance as fixed values.

As described above, the state space model of the motor 3 can be expressed linearly and time-invariantly as indicated in Equations (8) to (10) above.

In this linear, time-invariant state space model, the error covariance matrix expressed by Equations (12) and (15) converges to a constant value, and thus, the Kalman gain g(k) calculated on the basis of the error covariance matrix also converges to a constant value, as indicated in Equation (13).

Therefore, in the linear Kalman filter according to the present embodiment, an estimation error covariance matrix and the Kalman gain g(k) can be calculated in advance. Thus, in the control circuit 1 according to the present embodiment, if a value of the Kalman gain g(k) previously calculated is stored in a storage device inside the control circuit 1, it is possible to omit the process of calculating the estimation error covariance matrix and the Kalman gain g(k).

Specifically, the estimation unit 14 of the control circuit 1 calculates the prior state estimation value $\hat{x}_{k/k-1}$ by performing an arithmetic operation based on Equation (18) below in the prediction step of a linear Kalman filter, and calculates the posterior state estimation value $\hat{x}_{k/k}$ by performing an arithmetic operation based on Equation (19) below in the update step (filtering step) of the linear Kalman filter.

[Math. 18]

$$\hat{x}_{k/k-1} = A_d \hat{x}_{k-1/k-1} + B_d V_{qref} \quad (18)$$

[Math. 19]

$$\hat{x}_{k/k} = \hat{x}_{k/k-1} + g(I_q - c^T \hat{x}_{k/k-1}) \quad (19)$$

In this equation, g is the Kalman gain and is a value calculated in advance by using Equations (10), (12), (13), (15), and (16) above.

The estimation unit 14 executes an arithmetic operation based on Equations (18) and (19) above to calculate the rotation angle θ and the rotation speed ω of the rotor of the motor 3. The arithmetic operation executed by the estimation unit 14 can be represented by the block diagram illustrated in FIG. 3.

Figure 3:
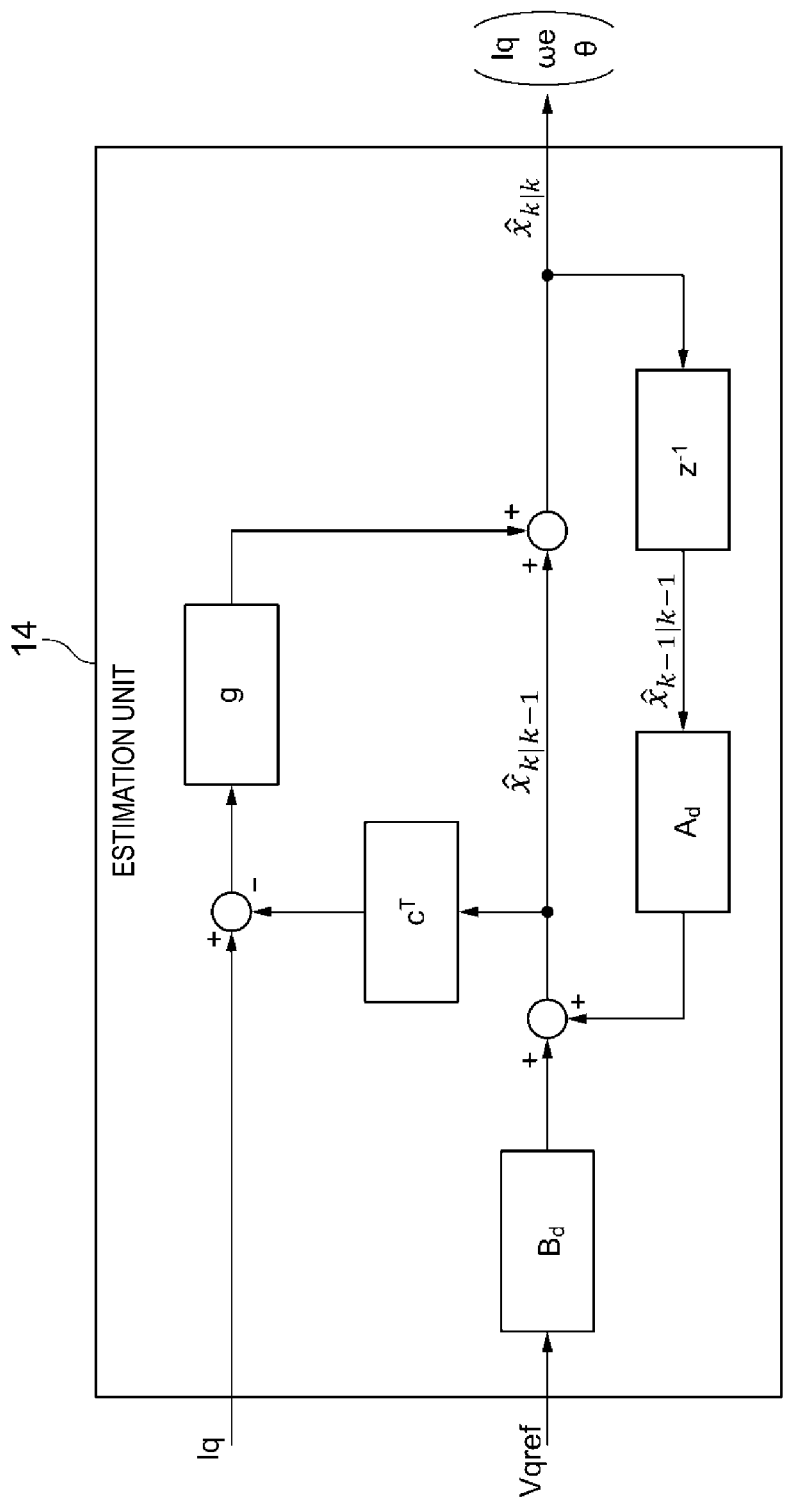
FIG. 3 is a block diagram illustrating an example of an arithmetic process in an estimation unit.

As illustrated in FIG. 3, the estimation unit 14 calculates the prior state estimation value $\hat{x}_{k/k-1}$ based on Equation (18) above, and the posterior state estimation value $\hat{x}_{k/k}$ based on Equation (19) above, on the basis of the input q-axis current value Iq and the input q-axis voltage command value Vqref, and outputs each of an estimation value of the rotation angle θ of the rotor and an estimation value of the rotation speed ω of the rotor included in the calculation result. Furthermore, the estimation unit 14 may output an estimation value of the q-axis current value Iq.

For example, arithmetic expression information 241 and coefficient information 242 are stored in advance in the storage unit 24 of the control circuit 1. The arithmetic expression information 241 is information about functions expressed by Equations (18) and (19) mentioned above. The coefficient information 242 is information about a coefficient (fixed value) used in the arithmetic operations of Equations (18) and (19) above, and is, for example, a value such as Ad, Bd, and the Kalman gain g. As described above, Ad, Bd, the Kalman gain g, and the like can be calculated in advance, and thus, are stored in the storage unit 24 as fixed values.

Based on the arithmetic expression information 241 (Equations (18) and (19)) and the coefficient information 242 (the Kalman gain g or the like) read out from the storage unit 24, the q-axis current value Iq output from the coordinate transform unit 15, and the q-axis voltage command value Vqref output from the q-axis voltage command value calculation unit 19, the estimation unit 14 sequentially executes the arithmetic operation of the prediction step and the arithmetic operation of the update step (filtering step) $\hat{x}(k)$ for each predetermined sampling period Ts to calculate the estimation values of the rotation angle θ and the rotation speed ω.

Note that the rotation speed of the rotor of the motor 3 calculated by the linear Kalman filter described above is the electric angular velocity ω. Therefore, the estimation unit 14 may convert the calculated electric angular velocity ω into a mechanical rotation speed (angular velocity) ω and supply the converted mechanical rotation speed ω to the error calculation unit 16, or may output the calculated electric angular velocity ω without converting the electric angular velocity ω, and the drive command acquisition unit 11 may transform the target rotation speed ωref into the electric angular velocity and supply the transformed electric angular velocity to the error calculation unit 16.

As described above, when the estimation unit 14 is realized by the linear Kalman filter described above (see FIG. 3), it is possible to omit the arithmetic operation for calculating the estimation error covariance matrix and the Kalman gain performed in a conventional extended Kalman filter, and thus, the arithmetic load of the estimation unit 14 can be reduced.

The estimation values of the rotation angle θ and the rotation speed ω calculated by the estimation unit 14 according to the arithmetic method described above are supplied to the coordinate transform units 15 and 22 and the error calculation unit 16. Thus, the control circuit 1 can execute an appropriate sensorless vector control arithmetic operation to generate the drive control signal Sd.

Next, the flow of a process for generating the drive control signal Sd by the motor drive control device 10 according to the present embodiment will be described.

Figure 4:
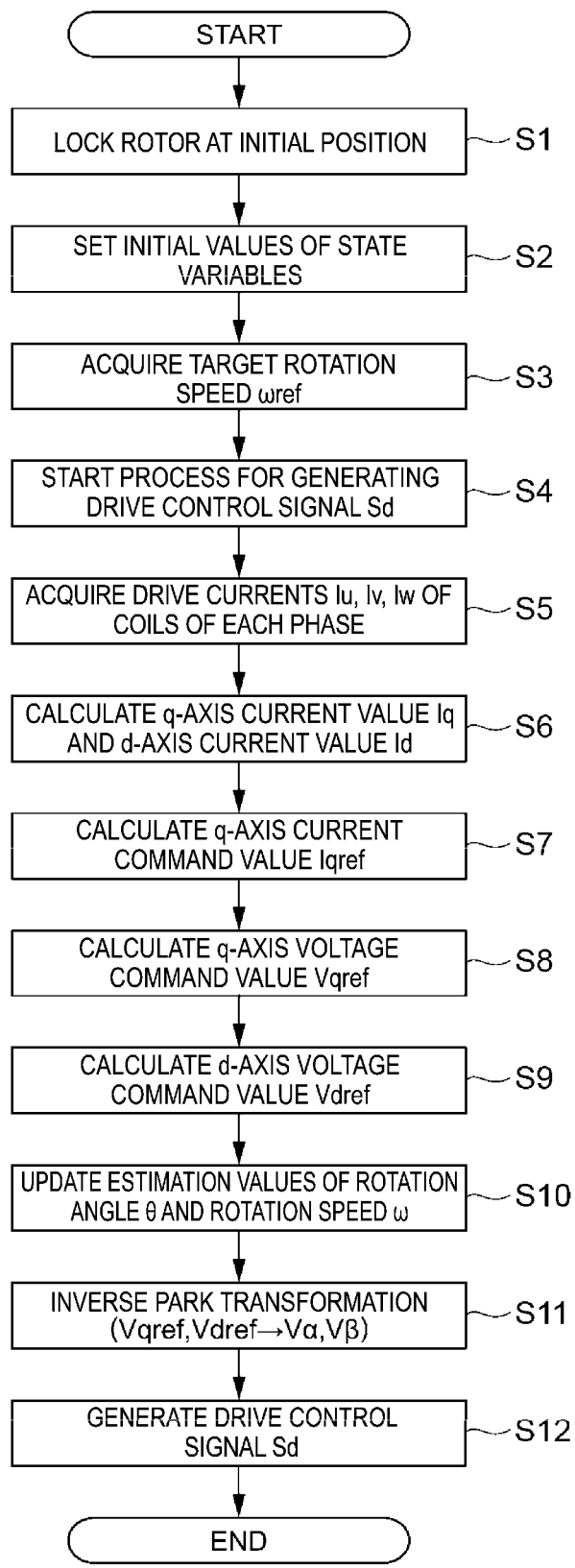
FIG. 4 is a flowchart illustrating an example of the flow of a process for generating a drive control signal by the motor drive control device according to the present embodiment.

FIG. 4 is a flowchart illustrating an example of the flow of the process for generating the drive control signal Sd by the motor drive control device 10 according to the present embodiment.

Generally, initial values of the state variables (Iq, ωe, θ) are required to start the arithmetic operation with the Kalman filter. For example, when the motor 3 is rotated from a stopped state, the initial values of the q-axis current value Iq and the rotation speed (electric angular velocity ω) of the motor 3, being state variables, are both zero. On the other hand, the rotation angle θ of the motor 3 is often unknown.

Thus, the motor drive control device 10 according to the present embodiment identifies a preset initial position of the rotor of the motor 3 before executing the arithmetic operation with the linear Kalman filter. For example, the motor drive control device 10 rotates the rotor to a position allowing the rotation angle θ of the motor 3 to be identified. For example, when the motor unit 100 is activated, the control circuit 1 first rotates and moves the rotor of the motor 3 to a preset initial position θ0 (for example, 0°) and locks the rotor (step S1). More specifically, after the control circuit 1 is activated, the control circuit 1 generates the drive control signal Sd according to the voltage command values Vα and Vβ having predetermined magnitudes to control the drive circuit 2. Therefore, the stator of the motor 3 is excited, and the rotor is fixed at the initial position θ0.

Note that the method for identifying the preset initial position of the rotor of the motor 3 is not limited to the method of rotating the rotor described above. For example, various methods such as a method of detecting a response received when a high-frequency voltage is applied to the motor 3 may be employed.

Next, the control circuit 1 sets an initial value x(0) of each of the state variables of the linear Kalman filter by the estimation unit 14 (step S2). For example, the estimation unit 14 sets the initial value x(0) of each of the state variables (Iq, ωe, θ) to (0, 0, 0).

Note that, the initial position θ0 of the rotor need not be a position with a rotation angle of 0°, and it is only required that the initial position θ0 of the rotor is a rotation position with a value of the rotation angle determined in advance. Furthermore, when the speed changes such as during activation, a precondition dωe/dt=0 is not satisfied. However, this situation can be handled by optimally setting a matrix Q being a tuning parameter.

Next, when the speed command signal Sc1 is input from a host device, for example, the control circuit 1 analyzes the speed command signal Sc1 to acquire information about the target rotation speed ωref of the motor 3 specified by the speed command signal Sc1 (step S3).

The control circuit 1 starts the process for generating the drive control signal Sd for rotating the motor 3 at the target rotation speed ωref (step S4). First, the control circuit 1 acquires the drive current values Iu, Iv, and Iw of the respective coils Lu, Lv, and Lw of the phases of the motor 3 (step S5). Specifically, as described above, the drive current value acquisition unit 13 calculates the drive current values Iu, Iv, and Iw of the respective coils of the phases on the basis of the current detection signal Vm output from the current detection circuit 2c.

Next, the control circuit 1 calculates the q-axis current value Iq and the d-axis current value Id of the two-phase (d, q) rotating coordinate system on the basis of the drive current values Iu, Iv, and Iw of the respective coils of the phases acquired in step S4 and the estimation value of the rotation angle θ of the rotor output from the estimation unit 14 (step S6). Specifically, as described above, the coordinate transform unit 15 applies Clarke transformation and Park transformation to the drive current values Iu, Iv, and Iw of the three-phase (U, V, W) fixed coordinate system to calculate each of the q-axis current value Iq and the d-axis current value Id of the two-phase (d, q) rotating coordinate system.

Note that, in a first arithmetic operation step immediately after the activation, an initial value (for example, 0°) of the rotation angle θ is provided to the coordinate transform unit 15 from the estimation unit 14.

Next, the control circuit 1 calculates the q-axis current command value Iqref so that the difference between the target rotation speed ωref of the motor 3 and the estimation value of the rotation speed ω of the rotor output from the estimation unit 14 is reduced (step S7). Specifically, as described above, the control circuit 1 calculates the difference between the target rotation speed ωref and the estimation value of the actual rotation speed ω of the motor 3 by using the error calculation unit 16, and the q-axis current command value calculation unit 17 calculates the q-axis current command value Iqref by performing a PI control arithmetic operation so that the difference calculated using the error calculation unit 16 is zero. Note that, in a first arithmetic operation step immediately after the activation, an initial value (for example, zero) of the rotation speed ω (ωe) is provided to the error calculation unit 16 from the estimation unit 14.

Next, the control circuit 1 calculates the q-axis voltage command value Vqref so that the difference between the q-axis current command value Iqref calculated in step S7 and the q-axis current value Iq calculated in step S6 is reduced (step S8). Specifically, as described above, the error calculation unit 18 calculates the difference between the q-axis current command value Iqref and the actual q-axis current value Iq of the motor 3, and the q-axis voltage command value calculation unit 19 calculates the q-axis voltage command value Vqref by performing a PI control arithmetic operation so that the difference calculated by the error calculation unit 18 is zero.

Furthermore, the control circuit 1 calculates the d-axis voltage command value Vdref so that the difference between the d-axis current command value Idref and the d-axis current value Id calculated in step S6 is reduced (step S9). Specifically, as described above, the error calculation unit 20 calculates the difference between the d-axis current command value Idref (=0) and the actual d-axis current value Id of the motor 3, and the d-axis voltage command value calculation unit 21 calculates the d-axis voltage command value Vdref by performing a PI control arithmetic operation so that the difference calculated by the error calculation unit 20 is zero.

Next, the control circuit 1 updates the estimation values of the rotation angle θ and the rotation speed ω of the motor 3 (step S10). Specifically, as described above, on the basis of the arithmetic expression information 241 (Equations (18) and (19)) and the coefficient information 242 (the Kalman gain g or the like) read out from the storage unit 24, the q-axis current value Iq output from the coordinate transform unit 15, and the q-axis voltage command value Vqref output from the q-axis voltage command value calculation unit 19, the estimation unit 14 sequentially executes the arithmetic operation of the prediction step and the arithmetic operation of the update step (filtering step) for each predetermined sampling period Ts, to update the estimation values of the rotation angle θ and the rotation speed ω.

Next, the control circuit 1 transforms the q-axis voltage command value Vqref calculated by the q-axis voltage command value calculation unit 19 and the d-axis voltage command value Vdref calculated by the d-axis voltage command value calculation unit 21 into the voltage command values Vα and Vβ of the two-phase (α, β) fixed coordinate system (step S11).

Specifically, the coordinate transform unit 22 applies inverse Park transformation to the d-axis voltage command value Vdref calculated in step S9 and the q-axis voltage command value Vqref calculated in step S8, by using the estimation value of the rotation angle θ calculated in step S10, to calculate the voltage command values Vα and Vβ.

Next, the control circuit 1 generates the drive control signal Sd on the basis of the q-axis voltage command value Vqref calculated in step S8 and the d-axis voltage command value Vdref calculated in step S9 (step S12). Specifically, as described above, the drive control signal generation unit 23 converts two-phase (α, β) voltage vectors of a fixed coordinate system represented by the voltage command values Vα and Vβ, into a voltage signal (PWM signal) of a three-phase (U, V, W) fixed coordinate system by a known space vector conversion arithmetic method, and outputs the converted signal as the drive control signal Sd.

The drive control signal Sd generated by the processing procedure described above is supplied to the drive circuit 2. The drive circuit 2 controls the energization of the coil of the motor 3 by the method described above on the basis of the input drive control signal Sd. Thus, the motor 3 is controlled to rotate at the target rotation speed ωref specified by the speed command signal Sc1.

Figure 5:
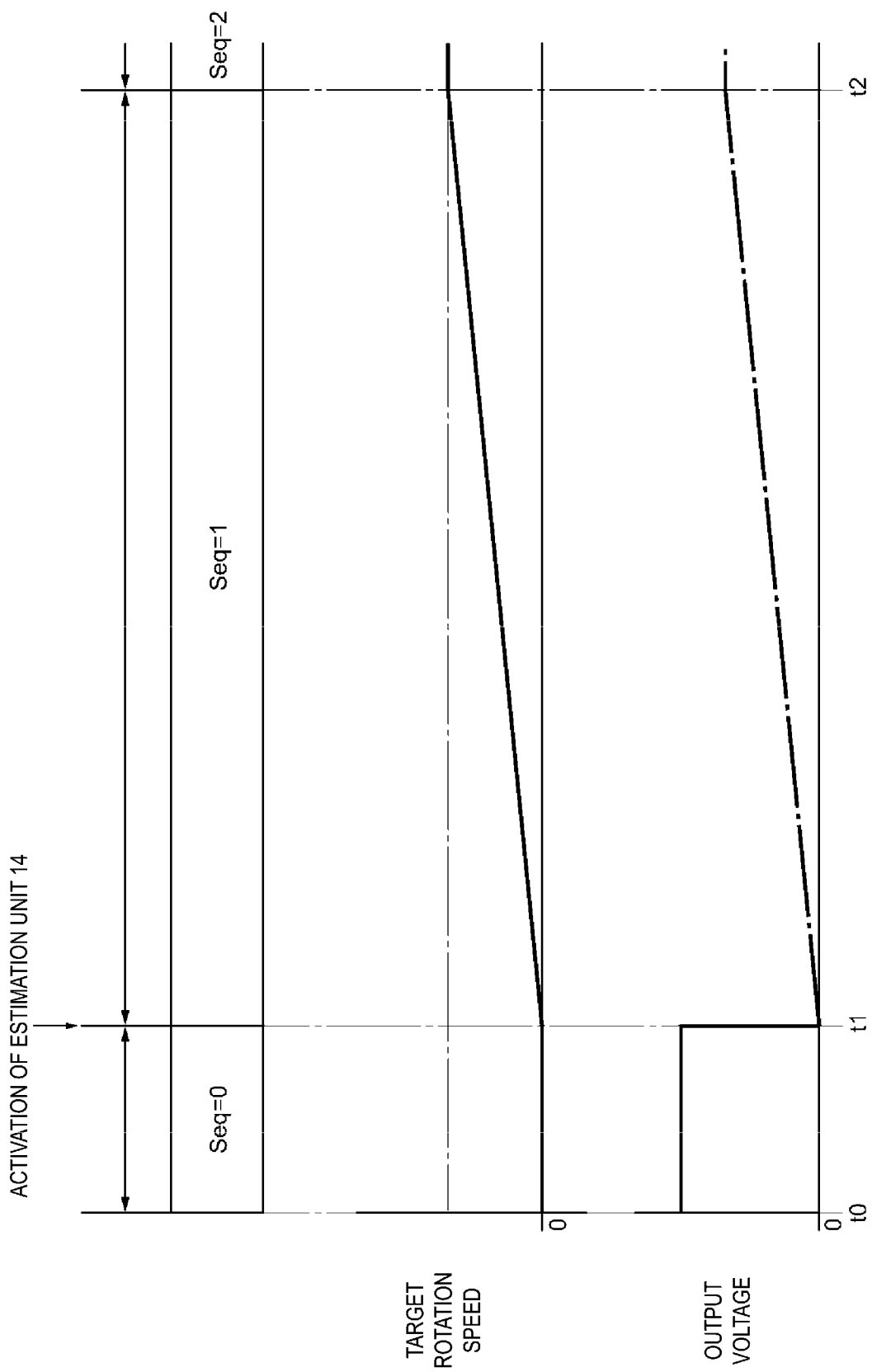
FIG. 5 is a timing chart showing an example of the flow of the process for generating the drive control signal by the motor drive control device according to the present embodiment.

FIG. 5 is a timing chart showing an example of the flow of the process for generating the drive control signal Sd by the motor drive control device 10 according to the present embodiment.

FIG. 5 shows the changing state of the magnitude (output voltage) of the voltage command value vectors (Vα and Vβ) when the target rotation speed is linearly increased from a stopping state of the motor 3 to a predetermined rotation speed.

As shown in FIG. 5, when the motor 3 is rotated from a stopping state of the motor 3 at a time t0, for example, the control circuit 1 generates, as described above, the drive control signal Sd according to the voltage command values Vα and Vβ having predetermined magnitudes, to thereby control the drive circuit 2. Thus, the stator of the motor 3 is energized, and the rotor is moved to the initial position θ0 (for example, 0°) and locked (seq=0). Thus, initial values of the state variables in the linear Kalman filter are set by the estimation unit 14.

After that, at a time t1, when the target rotation speed ωref is specified by the speed command signal Sc1, the estimation unit 14 starts the arithmetic operation according to the linear Kalman filter using the initial values of the set state variables, and sequentially executes the arithmetic operation of the prediction step and the arithmetic operation of the update step (filtering step) for each predetermined sampling period Ts to update the estimation values of the rotation angle θ and the rotation speed ω. Thus, the voltage command values Vα and Vβ are updated so that the motor 3 rotates at the target rotation speed ωref and appropriate commutation control is performed (seq=1). After the predetermined rotation speed is reached at a time t2, the motor 3 rotates steadily (seq=2).

According to the commutation control based on the estimation values of the rotation angle θ and the rotation speed ω by the linear Kalman filter according to the present embodiment, in a range with a low rotation speed of the motor 3, that is, in a range with a small q-axis current value Iq (observation value), drive control with the dominant prediction step (Equation (18)) is mainly performed to rotate the motor 3. On the other hand, when the rotation speed of the motor 3 increases, that is, when the q-axis current value Iq (observation value) increases, drive control with the dominant update step (Equation (19)) is performed to rotate the motor 3.

As described above, in sensorless vector control, the motor drive control device 10 according to the present embodiment uses a linear Kalman filter having a prediction step expressed linearly and time-invariantly to estimate the rotation angle θ and the rotation speed ω of the motor 3 from the q-axis current value Iq calculated on the basis of the drive current values Iu, Iv, and Iw and the q-axis voltage command value Vqref.

Accordingly, it is possible to reduce the arithmetic load of the control circuit 1 compared with sensorless vector control using a conventional extended Kalman filter. Specifically, in the present embodiment, the motor 3 is expressed by a state space model (Equations (8) and (9)) derived from the equation (Equation (5)) of the q-axis voltage of the motor 3 when the d-axis current value Id is zero and the rotation speed is constant (dωe/dt=0), and at least the q-axis current value Iq, the rotation angle θ, and the rotation speed ω (electric angular velocity ω) are state variables (Equation (6)).

According to the linear Kalman filter, compared to a conventional extended Kalman filter, it is possible to omit the arithmetic operation for calculating the estimation error covariance matrix and the Kalman gain, and thus, the arithmetic load of the control circuit 1 can be reduced. Thus, it is possible to reduce the processing capacity required for a program processing device (for example, a microcontroller) serving as the control circuit 1, and the motor drive control device 10 can be realized at a lower cost.

Furthermore, the control circuit 1 according to the present embodiment stores a function (Equation (18)) for the arithmetic operation of the prediction step and a function (Equation (19)) for the arithmetic operation of the update step (filtering step) as the arithmetic expression information 241 in the storage unit 24, and stores a previously calculated value of the Kalman gain or the like as the coefficient information 242 in the storage unit 24.

Thus, the control circuit 1 need only use the values stored in the storage unit 24 in the prediction step and the update step at each predetermined sampling period Ts to execute the arithmetic operations of Equations (18) and (19), thereby facilitating a reduction in the arithmetic load.

Furthermore, when the motor drive control device 10 according to the present embodiment starts the drive of the motor 3, the motor drive control device 10 starts an estimation process of the rotation angle θ and the rotation speed ω by the estimation unit 14 after moving the rotor of the motor 3 to a preset initial position and locks the rotor. Therefore, initial values of the state variables (Iq, ωe, θ) required for the arithmetic operation according to the linear Kalman filter can be reliably set, and motor drive control with higher accuracy can be achieved.

Expansion of Embodiment

The invention contrived by the present inventors has been described in detail above with reference to the embodiment. However, the present invention is not limited to the embodiment, and various modifications can be made without departing from the gist of the present invention.

For example, in the above embodiment, a case where the drive command signal Sc is the speed command signal Sc1 including a target value of the rotation speed (target rotation speed) of the motor 3 is described in an example, but the embodiment is not limited to this case. For example, the drive command signal Sc may be a torque command signal Sc2 for specifying torque of the motor 3. Below, another example of a control circuit in a case of the torque command signal Sc2 as the drive command signal Sc being input to a motor drive control device will be described.

Figure 6:
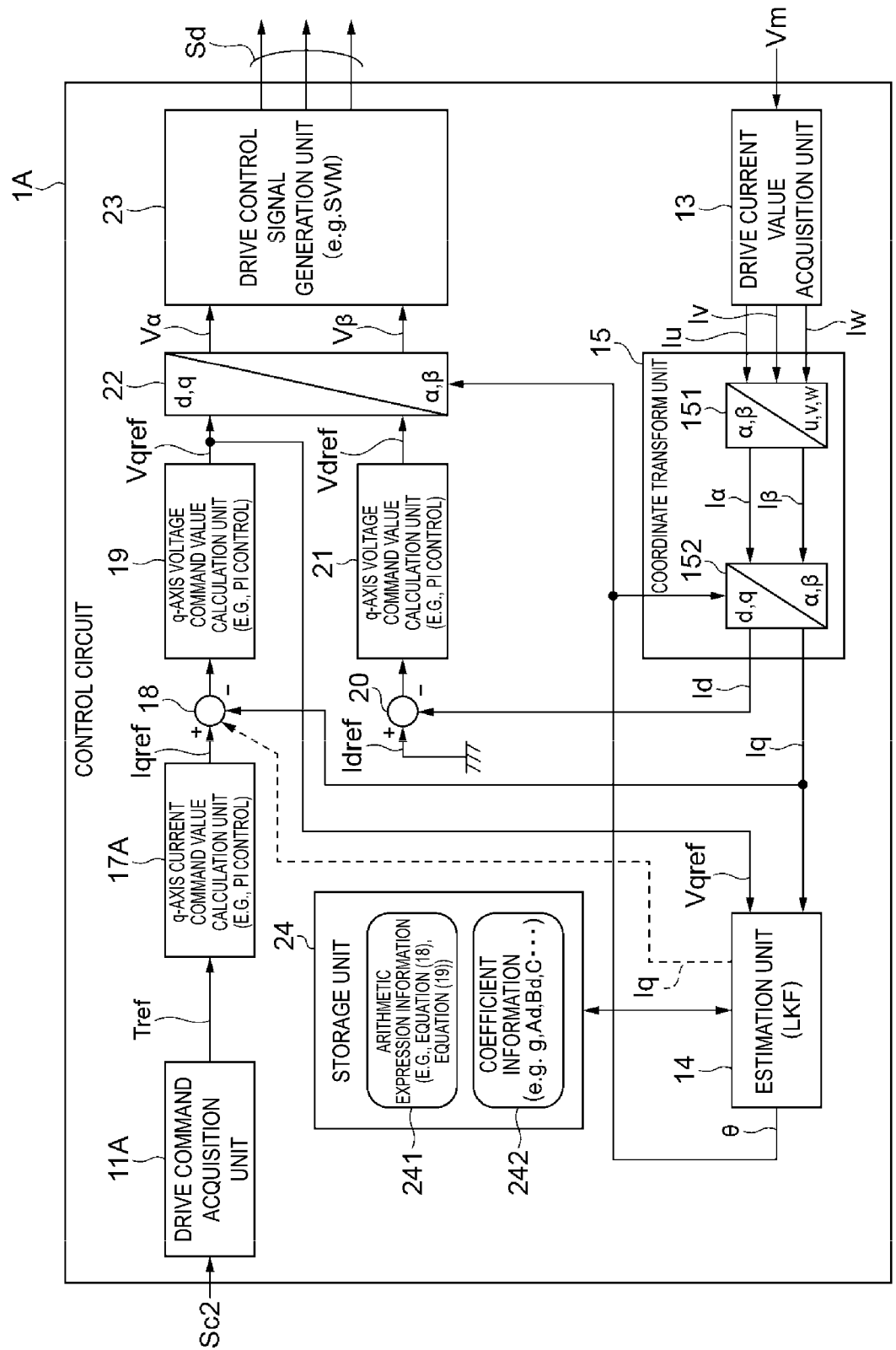
FIG. 6 is a diagram illustrating a functional block configuration of a control circuit in a motor drive control device according to another embodiment of the present invention.

FIG. 6 is a diagram illustrating a functional block configuration of a control circuit in a motor drive control device according to another embodiment of the present invention.

A control circuit 1A illustrated in FIG. 6 is the same as the control circuit 1, except that, instead of the drive command acquisition unit 11 and the q-axis current command value calculation unit 17, a drive command acquisition unit 11A and a q-axis current command value calculation unit 17A are provided.

The torque command signal Sc2 for specifying the torque of the motor 3 is input to the control circuit 1A as the drive command signal Sc. Here, the torque command signal Sc2 includes a torque command value Tref indicating a target value of the torque of the motor 3.

The drive command acquisition unit 11A receives the torque command signal Sc2 from the outside. The drive command acquisition unit 11A acquires and outputs the torque command value Tref included in the received torque command signal Sc2.

The q-axis current command value calculation unit 17A calculates the q-axis current command value Iqref on the basis of the torque command value Tref output from the drive command acquisition unit 11A. For example, without performing PI control, the q-axis current command value calculation unit 17A multiplies the torque command value Tref by "1/(P*ψ)" determined when Id=0 in Equation (1) above, to calculate the q-axis current command value Iqref.

The q-axis current command value Iqref calculated by the q-axis current command value calculation unit 17A is applied to the error calculation unit 18, as in the case of the control circuit 1 described above. The processing subsequent to the processing by the error calculation unit 18 in the control circuit 1A is similar to that in the control circuit 1.

As described above, according to the control circuit 1A, even when a torque command value as a value indicating the target state of the operation of the motor 3 is input to the motor drive control device, an effect similar to that of the control circuit 1 described above can be obtained.

Furthermore, in the embodiment described above, a case of the motor 3 being a surface permanent magnet synchronous motor (SPMSM) is described, but the motor 3 is not limited to this configuration. For example, even when the motor 3 is not the surface permanent magnet synchronous motor (SPMSM) (for example, when the motor 3 is an IPMSM), it is possible to use the motor drive control device 10 according to the present embodiment, in a case of vector control being performed so that the d-axis current command value is always zero, without utilizing a reluctance torque.

Furthermore, in the embodiment described above, the control circuit 1 is not limited to the circuit configuration described above. Various circuit configurations configured to meet the object of the present invention can be applied to the control circuit 1.

The number of phases of the motor driven by the motor drive control device according to the embodiment described above is not limited to three phases.

The flowchart described above is a specific example and the process flow is not limited to this flowchart. For example, another process may be inserted between each of the steps, or processes may be performed in parallel.

REFERENCE SIGNS LIST

1 . . . Control circuit
2 . . . Drive circuit
2a . . . Inverter circuit
2b . . . Pre-drive circuit
2c . . . Current detection circuit
3 . . . Motor
10 . . . Motor drive control device
11 . . . Drive command acquisition unit
13 . . . Drive current value acquisition unit
15 . . . Coordinate transform unit (example of first coordinate transform unit)
22 . . . Coordinate transform unit (example of second coordinate transform unit)
16, 18, 20 . . . Error calculation unit
17, 17A . . . q-axis current command value calculation unit
19 . . . q-axis voltage command value calculation unit
21 . . . d-axis voltage command value calculation unit
23 . . . Drive control signal generation unit
24 . . . Storage unit
100 . . . Motor unit
151 . . . Clarke transform unit
152 . . . Park transform unit
241 . . . Arithmetic expression information
242 . . . Coefficient information
Iu, Iv, Iw . . . Drive current value
Q1 to Q6 . . . Drive transistor
Sc . . . Drive command signal
Sc1 . . . Speed command signal
Sc2 . . . Torque command signal
Sd . . . Drive control signal
θ . . . Rotation angle
ω . . . Rotation speed
ωe . . . Electric angular velocity
Iα, Iβ . . . Current of two-phase fixed coordinate system
Id . . . d-axis current value
Idref . . . d-axis current command value
Iq . . . q-axis current value
Iqref . . . q-axis current command value
Vα, Vβ . . . Voltage command value of two-phase fixed coordinate system
Vd . . . d-axis voltage
Vdref . . . d-axis voltage command value
Vq . . . q-axis voltage
Vqref . . . q-axis voltage command value
Vcc . . . DC power supply
Vuu, Vul, Vvu, Vvl, Vwu, Vwl . . . Drive signal
Vm . . . Current detection signal
ωref . . . Target rotation speed

What is claimed is:

1. A motor drive control device, comprising:
a drive circuit configured to drive a motor on the basis of a drive control signal for driving the motor; and
a control circuit configured to perform a vector control arithmetic operation based on a detection result of a drive current of a coil of the motor to generate the drive control signal and supply the drive control signal to the drive circuit, wherein
when generating the drive control signal, the control circuit is configured to estimate a rotation angle of a rotor of the motor and a rotation speed of the rotor on the basis of a q-axis current value of a two-phase rotating coordinate system calculated on the basis of a detection result of the drive current, and a q-axis voltage command value of the two-phase rotating coordinate system, by using a linear Kalman filter including a prediction step and an update step,
the linear Kalman filter being a stationary Kalman filter with the prediction step expressed linearly and time-invariantly, wherein the control circuit is further configured to:

acquire a drive current value of the coil of the motor;

estimate the rotation angle and the rotation speed;

perform Clarke transformation and Park transformation on the basis of the drive current value and the rotation angle to calculate the q-axis current value and a d-axis current value of the two-phase rotating coordinate system;

calculate a q-axis current command value of the two-phase rotating coordinate system on the basis of a value indicating a target state of an operation of the motor;

calculate the q-axis voltage command value of the two-phase rotating coordinate system, so that a difference between the q-axis current command value and a value based on the q-axis current value is small, and perform an arithmetic operation based on the linear Kalman filter, and in the arithmetic operation based on the linear Kalman filter, receive the q-axis current value and the q-axis voltage command value and output an estimation value of the rotation angle and an estimation value of the rotation speed.

2. The motor drive control device according to claim 1, wherein the motor is expressed by a state space model derived from an equation of a q-axis voltage of the motor when a d-axis current value is zero and the rotation speed is constant, and at least the q-axis current value, the rotation angle, and the rotation speed are state variables.

3. The motor drive control device according to claim 2, wherein a state vector x(t) including the state variables is expressed by Equation (A) below and the state space model is expressed by Equations (B) and (C) below, where Iq(t) is the q-axis current value, ωe(t) is an electric angular velocity as the rotation speed, θ(t) is the rotation angle, and Vqref is the q-axis voltage command value, and Ac, Bc, and c in the Equations (B) and (C) above are each expressed by Equations (D) below, where Ra is a resistance of the coil, Lq is a q-axis inductance, and Ψa is a magnetic flux of a magnet in a d-axis direction.

[Math. 1]

$$x(t) = \begin{pmatrix} I_q(t) \\ \omega_e(t) \\ \theta(t) \end{pmatrix} \quad (A)$$

[Math. 2]

$$\frac{dx(t)}{dt} = A_c x(t) + B_c V_{qref}(t) \quad (B)$$

$$I_q(t) = c^T x(t) \quad (C)$$

[Math. 3]

$$A_c = \begin{pmatrix} -\frac{R_a}{L_q} & -\frac{\Psi_a}{L_q} & 0 \\ 0 & 0 & 0 \\ 0 & 1 & 0 \end{pmatrix}, \quad (D)$$

$$B_c = \begin{pmatrix} \frac{1}{L_q} \\ 0 \\ 0 \end{pmatrix},$$

$$c = \begin{pmatrix} 1 \\ 0 \\ 0 \end{pmatrix}$$

4. The motor drive control device according to claim 3, wherein the control circuit is further configured to calculate a prior state estimation value $\hat{x}_{k|k-1}$ of the state variables on the basis of Equation (G) below in the prediction step, and calculate a posterior state estimation value $\hat{x}_{k|k}$ of the state variables on the basis of Equation (H) below in the update step, and Ad, Bd, and g in Equations (G) and (H) below are fixed values,

[Math. 11]

$$\hat{x}_{k|k-1} = A_d \hat{x}_{k-1|k-1} + B_d V_{qref} \quad (G)$$

[Math. 5]

$$\hat{x}_{k|k} = \hat{x}_{k|k-1} + g(I_q - c^T \hat{x}_{k|k-1}) \quad (H)$$

5. The motor drive control device according to claim 4, wherein the control circuit is further configured to store arithmetic expression information including the Equations (G) and (H) and coefficient information including at least values of Ad, Bd, and g, and the control circuit is further configured to calculate an estimation value of the rotation angle and an estimation value of the rotation speed by using the arithmetic expression information and the coefficient information.

6. The motor drive control device according to claim 1, wherein the control circuit is further configured to estimate the rotation angle and the rotation speed after identifying an initial position of the rotor.

7. The motor drive control device according to claim 1, wherein a value indicating the target state of the operation of the motor is a target value of the rotation speed of the motor.

8. The motor drive control device according to claim 1, wherein the value indicating the target state of the operation of the motor is a target value of torque of the motor.

9. A motor drive control method, comprising:

a first step of acquiring a drive current value of a coil of a motor; and a second step of performing a vector control arithmetic operation based on the drive current value acquired in the first step to generate a drive control signal for driving the motor, wherein the second step includes estimating a rotation angle of a rotor of the motor and a rotation speed of the rotor on the basis of a q-axis current value of a two-phase rotating coordinate system calculated on the basis of the drive current value, and a q-axis voltage command value of the two-phase rotating coordinate system, by using a linear Kalman filter, and the linear Kalman filter is a stationary Kalman filter with a prediction step expressed linearly and time-invariantly, wherein the second step includes:
an estimation step configured to estimate the rotation angle and the rotation speed;
a first coordinate transform step configured to perform Clarke transformation and Park transformation on the basis of the drive current value acquired by the drive current value acquisition step and the rotation angle estimated by the estimation step to calculate the q-axis current value and a d-axis current value of the two-phase rotating coordinate system;
a q-axis current command value calculation step configured to calculate a q-axis current command value of the two-phase rotating coordinate system on the basis of a value indicating a target state of an operation of the motor; and
a q-axis voltage command value calculation step configured to calculate the q-axis voltage command value of the two-phase rotating coordinate system, so that a difference between the q-axis current command value calculated by the q-axis current command value calculation step and a value based on the q-axis current value calculated by the first coordinate transform step is small, and
the estimation step performs an arithmetic operation based on the linear Kalman filter, and in the arithmetic operation based on the linear Kalman filter, the estimation step receives the q-axis current value calculated by the first coordinate transform step and the q-axis voltage command value calculated by the q-axis voltage command value calculation step and outputs an estimation value of the rotation angle and an estimation value of the rotation speed.

* * * * *